(12) United States Patent
Reeves et al.

(10) Patent No.: US 7,128,970 B2
(45) Date of Patent: Oct. 31, 2006

(54) GRAPHICS TRANSFERS FOR USE IN ROTATIONAL MOLDING

(75) Inventors: Robert Alan Reeves, Cottonwood, AZ (US); Michael J. Stevenson, 1200 Soldier Pass Rd., Sedona, AZ (US) 86336

(73) Assignee: Michael J. Stevenson

( * ) Notice: Subject to any disclaimer, the term of this patent is extended or adjusted under 35 U.S.C. 154(b) by 0 days.

(21) Appl. No.: 09/862,542

(22) Filed: May 22, 2001

(65) Prior Publication Data

US 2002/0175442 A1    Nov. 28, 2002

(51) Int. Cl.
B32B 15/04    (2006.01)
B32B 7/12    (2006.01)

(52) U.S. Cl. .................. 428/343; 428/354; 428/349

(58) Field of Classification Search ............ 428/743, 428/354, 349; 524/765
See application file for complete search history.

(56) References Cited

U.S. PATENT DOCUMENTS

| | | |
|---|---|---|
| 4,239,796 A | 12/1980 | Shanoski et al. |
| 4,252,762 A | 2/1981 | Stevenson |
| 4,282,285 A | 8/1981 | Mohiuddin |
| 4,356,230 A | 10/1982 | Emanuel et al. |
| 4,389,454 A | 6/1983 | Horacek et al. |
| 4,499,235 A | 2/1985 | Verwer et al. |
| 4,519,972 A | 5/1985 | Stevenson |
| 4,529,624 A * | 7/1985 | Hubbard ............... 427/148 |
| 4,548,779 A | 10/1985 | Steinberg et al. |
| 4,555,436 A * | 11/1985 | Geurtsen et al. ......... 428/200 |
| 4,681,712 A | 7/1987 | Sakakibara et al. |
| 4,980,107 A | 12/1990 | Falline et al. |
| 4,980,113 A | 12/1990 | Cummings et al. |
| 5,035,849 A | 7/1991 | Uemura et al. |
| 5,223,315 A * | 6/1993 | Katsura et al. ......... 428/36.92 |
| 5,606,356 A * | 2/1997 | Noguchi et al. ......... 347/100 |
| 5,746,961 A | 5/1998 | Stevenson et al. |
| 5,824,176 A * | 10/1998 | Stein et al. ............ 156/239 |
| 5,840,142 A | 11/1998 | Stevenson |
| 5,908,694 A * | 6/1999 | Makar et al. ............ 428/349 |
| 5,932,319 A * | 8/1999 | Makar et al. ............ 428/195 |
| 6,254,970 B1 * | 7/2001 | Hiatt et al. ............ 428/200 |

FOREIGN PATENT DOCUMENTS

| | | |
|---|---|---|
| EP | 562 716 A1 | 9/1993 |
| GB | 917844 | 2/1963 |
| JP | 110459 | 8/1975 |
| JP | 48-42211 | 10/1980 |

* cited by examiner

Primary Examiner—Terrel Morris
Assistant Examiner—Victor S. Chang
(74) Attorney, Agent, or Firm—Robert E Strauss

(57) ABSTRACT

This invention is an indica transfer and method for its use to impart indica to polyolefin objects during rotational molding. The transfer is a laminate of at least two coats on a carrier sheet, which is preferably a flexible, transparent polymer sheet. The coats, as successive layers on the carrier sheet are: an indica coat of indica material in a graphic or alphanumerical array and a top coat of a top-coat pressure sensitive adhesive. Preferably the transfer also includes a backing coat of a backing-coat pressure sensitive adhesive between the carrier sheet and the indica coat, The pressure sensitive adhesive used for the top coat has a transition temperature less than the mold surface temperature onto which the transfer is applied to enable transfer of the coats to the interior surface of a rotational mold. The pressure sensitive adhesive used for the backing coat has a transition temperature greater than the surface temperature of the mold to which the transfer is to be applied, and both pressure sensitive adhesives have transition temperatures which are below the molding temperature and preferably below the melt temperature of the molding polyolefin used to form the molded part.

9 Claims, No Drawings

GRAPHICS TRANSFERS FOR USE IN ROTATIONAL MOLDING

BACKGROUND OF THE INVENTION

1. Field of Invention

This invention relates to rotational molding of plastics and, in particular, to transfers useful to impart printed matter, including graphic and alphanumerical information to rotational molded parts.

2. Brief Statement of the Prior Art

Rotational molding is traditionally used for fabrication of hollow form objects from plastics, particularly from polyethylene. Polyolefin surfaces, particularly polyethylene surfaces, however, resist acceptance of coats. A prevalent method of imparting coats of materials such as printed matter or decoration has been to oxidize the polyethylene surface by flame treatment to improve adhesion of subsequently applied materials. A less destructive method is described in U.S. Pat. No. 4,352,762 in which decorative or alphanumerical indicia are applied as a viscous oil suspension to the interior mold surface by silk screen printing for transfer to the molded part during molding. Further developments of this approach have included transferring indicia from a carrier sheet by burnishing the indicia onto the interior surface of the mold; see U.S. Pat. No. 4,519,972. These developments spurned other developments such as disclosed in U.S. Pat. Nos. 5,648,030 and 5,498,307. Commercial practice with such graphics transfers developed a technique of spraying the interior surfaces of the mold with an adhesive to enhance bonding, and hence transfer, of the graphics indicia to the mold surfaces from a carrier sheet. In practice, however, the adhesives are often not applied uniformly and frequently are used in excess, causing product discoloration and adhesive buildup on the mold surfaces. The adhesives sprays also use volatile solvents which present environmental concerns during use, shipment and storage. If not completely expelled prior to application of the transfer, any residual solvent will damage the indicia of the transfer. The application of an adhesive to the mold surface prior to application of the transfer molding operation, prolonging the molding cycle time.

OBJECTIVES OF THE INVENTION

It is an objective of this invention to provide a method to impart indicia to the surface of molded polyolefin, particularly polyethylene, parts.

It is a further objective of this invention to provide an indicia transfer and method for its use to impart indicia to the interior surface of a mold without the step of applying an adhesive to the mold surface.

It is also an objective of this invention to provide a method of imparting indicia to the surface of a mold without use of adhesive sprays.

It is an additional objective of this invention to provide a transfer and method of its use to impart indicia to an interior surface of a mold which minimize delays in the molding cycle.

It is likewise an objective of this invention to provide an indicia transfer which can be precisely located on the interior surface of a mold.

It is a further objective of this invention to provide an indicia transfer having various agents which transfer to the mold surface and become additives and enhancers in the surface of the molded part.

Other and related objectives will be apparent from the following description of the invention.

BRIEF DESCRIPTION OF THE INVENTION

This invention is an indicia transfer and method for its use to impart indicia to polyolefin parts during molding. The transfer is a laminate of at least two, and preferably three, coats on a carrier sheet, which is preferably a flexible, transparent polymer sheet. The coats, as successive layers on the carrier sheet are: an optional, but preferred, backing coat of a pressure sensitive adhesive, an indicia coat of indicia in a graphic or alphanumerical array, and a top coat of a pressure sensitive adhesive. A protective overlay or slip sheet can also be provided to protect the coats during shipment and storage of the transfer. When a backing coat is used, the pressure sensitive adhesive used for the backing coat has a greater transition temperature than does the pressure sensitive adhesive used for the top coat to enable transfer of the coats to the interior surface of a rotational mold and transfer of the coats to the molded part during molding.

DESCRIPTION OF THE PREFERRED EMBODIMENTS

The invention is intended for use in rotational molding operations, In this operation, hollow-form plastic parts are formed in a rotational molding cycle wherein plastic particles are charged to a rotational mold, the mold is closed, heated to a molding temperature while being rotated about its major and minor axes for a time sufficient to form the molded part and the mold is cooled to a demolding temperature, opened and the molded part is ejected, The carrier sheet useful for the transfer of this invention can be any flexible, dimensional stable paper or plastic film. Paper such as parchment paper can be used, however, the adhesive backing coat permits the use of plastic film and transparent plastic film, particularly polyester film, is preferred because it permits precise, visual orientation of the indicia on the interior mold surface.

The indicia coat comprises an indicia material in a printed pattern such as a graphic or alphanumerical array which is desired to be imparted to the part during molding. The indicia material is used admixed with wax particles. Preferably the mixture contains these components in proportions suitable for silk screen printing such as from 30 to 99 weight percent wax and from 1 to 70 weight percent indicia material. Preferably the mixture contains from 60 to 85 weight percent wax and from 15 to 40 weight percent indicia material. If desired, viscosity additives such as silica or silicates can be added in minor amounts to provide an optimum viscosity (100 to 1000 centipoise) for screen printing.

The wax used in the indicia coat can be a hydrocarbon wax which is preferably transparent or lightly colored so as to avoid any coloration or shading to the indicia. Examples of suitable waxes include natural waxes, paraffin wax, synthetic wax, microcrystalline wax, etc. A very suitable wax is a microcrystalline wax having a melting point from 90 to 300 degrees F., preferably from 110 to 250 degrees F. and a molecular weight from 500 to 1000, preferably from 600 to 750.

Microcrystalline waxes are refined petroleum waxes that have wax from highly paraffinic petroleum stocks.

Plastic waxes are less refined and contain branched chain and cyclic hydrocarbons. Typically plastic waxes have hardness values and crystallinity less than those of microcrystalline waxes.

Paraffin wax comprises chiefly n-paraffin hydrocarbons having from 16 to 38 carbons with limited quantities of branched chain paraffins, monocyclic and polycyclic paraffins.

Synthetic hydrocarbon waxes are obtained by the polymerization and copolymerization of hydrocarbon olefins such as ethylene and propylene. Typically these synthetic waxes have molecular weights from 400 to about 3,000 with a narrow molecular weight distribution.

Various additives can be incorporated in the wax in minor quantities to improve the properties of the wax such as polyisobutylene to increase the viscosity of the wax, ultraviolet light protectants such as hindered amines, and tackifiers such as polyterpene resins, rosins and aliphatic and aromatic hydrocarbons. These can be used in concentrations from 2 to about 25 weight percent, and tackifiers can be used in amounts from about 5 to 35 weight percent of the mixture.

Useful indicia material can be colorants such as pigments and dyes as well as metal particles in flake or ball shape. Useful colorants include those containing inorganic pigments such as titanium dioxides (rutile analase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide or cadmium sulfoselenides, nickel and titanium dioxide mixtures, sodium, potassium or ammonium coordination compounds of ferriferrocyanide, ultramarine blues (a calcined mixture of china clay, sodium carbonate, silica, sulfur and reducing agents), cobalt aluminate (cobalt blues), chromium oxide, metal flake pigments such as aluminum zinc copper borate powders, metal silver pigments, pearlescent and iridescent flakes of basic lead carbonates, bismuth oxychlorides and titanium coated mica, etc. Various organic pigments which are useful include azo pigments such as benzimidazolone pigments, pyrazolone pigments, copper phthalocyanine quinacridones, anthraquinones, condensations pigments, tetra-chloro-isoindolinones, carbon blacks, etc. In instances where electrical conductivity is desired, flakes and powders of metals such as copper, nickel, silver, silver coated nickel, silver coated glass beads, antimony doped tin oxide can be used.

The top coat contains a pressure sensitive adhesive which is substantially non-tacky at ambient temperatures and becomes tacky at the temperature of the mold surface to which the transfer is applied, typically at demolding temperatures from 90 degrees to 170 degrees F., preferably from 110 degrees to 160 degrees F.

The top coat functions to provide adhesion of the indicia coat and backing coat to the hot interior surface of the mold and to release from the mold surface during the molding operation, becoming incorporated with the indicia and backing coat into the surface of the molded part.

To facilitate this function, the transition temperature of the pressure sensitive adhesive used for top coat is at or slightly below the temperature of the mold surface to which the transfer is applied, typically at or less than the demolding temperature. Preferably, the viscosity of the pressure sensitive adhesive used for this coat is from 100 to 1000 centipoise at the demolding temperature.

The top coat can also contain additives which are useful in the surface of the final molded part. Examples of such additives are ultraviolet light protectants such as hindered amines, abrasion resistant materials such as glass beads, optical brighteners, and colorants to tint the transferred indicia and iridescent agents such as flakes of basic lead carbonates, bismuth oxychlorides and titanium coated mica.

The backing coat of the transfer of this invention functions to bond the successive indicia and adhesive coats to the carrier sheet during handling and storing of the transfer which occurs at ambient temperatures and to release from the carrier sheet at or near the temperature of the mold surface to which the transfer is applied, which preferably is at typical demolding temperatures, from 110 to about 125 degrees F. The pressure sensitive adhesive used in the backing coat should have a transition temperature greater than the temperature of the mold surface to which the transfer is applied to obtain clean separation from the carrier sheet.

The backing coat can also contain background color for the indicia, or fillers such as silica or silicates, abrasion resistant additives such as glass beads to provide scuff resistance to the indicia coat during the molding cycle, or ultraviolet light protectants such as hindered amines. The weight content of pigments depends on the type of pigment and intensity of background color desired, however, the pigments can be used at a concentration of from 1 to about 65 weight percent, preferably from 25 to 45 weight percent. Fillers and abrasion resistant additives can be used at concentrations from 1 to about 75 weight percent, preferably from 25 to 50 weight percent.

The temperatures at which the coats change from a solid to liquid should be less than the molding temperature and preferably less than the melt temperature of the molding polymer used for the molded part. Since the coats which contain blends of components do not exhibit sharp melting points, the temperature band at which the solid to liquid phase occurs for a blend is commonly referred to as its transition temperature. All of the components of the coats should be stable and resist decomposition and decoloration at molding temperatures, typically from 350 degrees to 650 degrees F. The applied coats should also be flexible to permit placing the transfers against contoured mold surfaces without chipping or cracking.

The top and backing coats are applied over one or more areas of the carrier sheet selected to receive the indicia coat. Preferably the backing and top coats are applied over an area slightly greater than the area which receives the indicia coat, thereby overlapping the indicia coat. When a backing coat is used, the indicia coat is encapsulated entirely between the backing and top coats.

The transfers are readily applied to the hot internal surface of molds used in rotational molding with the top coat in direct contact with the mold surface. Because the carrier sheet of the transfers is a flexible, transparent plastic film, the transfer can be precisely oriented onto the mold surface. The transfer is completed by pressing the exposed outer surface of the carrier sheet against the surface of the mold. The coats of the transfer adhere to the hot mold surface, releasing the carrier sheet, which is removed. Since the carrier sheet readily separates from the coats it is not necessary to use burnishing pads or other implements to secure the release, thus avoiding the possibility of marring the interior surface of the mold. Thereafter, the steps and conditions typically practiced with rotational molding can be practiced, since the transfers of the invention are entirely compatible with conventional rotational molding. Briefly, these steps are to charge the mold with molding resin, typically polyethylene resin particles with sizes from 16 to 60, usually 35 mesh, close the mold and heat it to the molding temperatures while rotating the mold about its major and minor axes for the time and at the temperature conditions tailored for the particular part and molding resin. During the molding cycle, the coats transfer to the part and become permanently incorporated into the outer surface of the part. At the completion of the molding cycle, the mold is cooled, opened and the part is ejected. The top coat of the transfer separates from the surface of the mold, leaving no significant amount of residue on the mold surface when the molded part is ejected from the mold.

The invention is further described and illustrated in the following examples.

EXAMPLE

A transfer is prepared by applying a backing coat of a pressure sensitive adhesive to a transparent polyester film having a thickness of 1 mil. The pressure sensitive adhesive is a hydrocarbon blend having a transition temperature of 160–190 degrees F. Thereafter, an indicia coat having indicia consisting of graphics (a trademark logo) and printed material (product name and manufacturer source data) is coated over the backing coat.

The composition useful for the indicia coat is a mixture of a synthetic wax having a transition temperature of 165 degrees F., and 10 weight percent of carbon black.

Thereafter, a top coat of a pressure sensitive adhesive is applied over the area previously printed with the backing and indicia coats. The pressure sensitive adhesive used for this coat is a hydrocarbon blend having a transition temperature of 130–170 degrees F.

The transfer is applied to the internal surface of a rotational mold having a surface temperature of 145 degrees F. by pressing against the exposed, uncoated side of the carrier sheet to transfer the coats to the mold surface. The carrier sheet is removed, the mold is charged with 35 mesh polyethylene resin particles, closed and processed through a molding cycle by heating the mold to 500 degrees F. while rotating the mold at 8 rpm about its major axis and 2 rpm about its minor axis for 10 minutes. The mold is then cooled to 148 degrees F., opened and the part is ejected. The part has the indicia permanently embedded in its outer surface and the interior of the mold is clean with no residue from the transfer coats.

The invention has been described with reference to the illustrated and presently preferred embodiment. It is not intended that the invention be unduly limited by this disclosure of the preferred embodiment. Instead, it is intended that the invention be defined by the elements, and their obvious equivalents, set forth in the following claims.

What is claimed is:

1. A two-stage transfer for application to the interior surface of a rotational mold to impart indicia to a polyethylene product molded in said rotational mold at a molding temperature and ejected from the rotational at a demolding temperature less than the molding temperature, said transfer consisting essentially of:

a carrier sheet of a flexible material having an indicia area for reception of said indicia and having successive coats overlying said indicia area, said coats consisting essentially of:

a. an indicia coat, in a preselected direct-image indicia array consisting essentially of a mixture of indicia material and hydrocarbon wax overlying said indicia area;

b. a top coat of a pressure sensitive adhesive which is substantially non-adhesive at ambient temperature and adhesive at said demolding temperature substantially covering said indicia area and overlying said direct-image indicia array; and c. a backing coat of a pressure sensitive adhesive between said carrier sheet and indicia coat substantially covering said indicia area which backing coat bonds to the carrier sheet at ambient temperatures and releases from the carrier sheet at said demolding temperature;

said indicia, bottom and top coats being stable and resistant to decomposition at said molding temperature, and having melting temperatures less than said molding temperature to transfer to and become permanently incorporated into the surface of said polyolefin product, leaving no significant amount of residue on said mold surface.

2. The transfer of claim 1 wherein said backing and top coats extend peripherally beyond said indicia area, thereby encapsulating said indicia coat within said backing and top coats.

3. The transfer of claim 1 wherein said indicia coat is a mixture of from 30 to 99 weight percent hydrocarbon wax and from 1 to 70 weight percent colorant.

4. The transfer of claim 1 wherein said backing coat adhesive is a hydrocarbon wax.

5. The transfer of claim 1 wherein said flexible carrier sheet is a transparent plastic film.

6. The transfer of claim 5 wherein said plastic film is polyester film.

7. The transfer of claim 1 wherein said indicia coat is a mixture of from 60 to 80 weight percent hydrocarbon wax and from 15 to 40 weight percent colorant.

8. The transfer of claim 7 wherein said hydrocarbon wax is a synthetic wax.

9. The transfer of claim 7 wherein said hydrocarbon wax is a transparent wax.

* * * * *